United States Patent
Choi

(10) Patent No.: US 7,055,161 B2
(45) Date of Patent: May 30, 2006

(54) OPTICAL PICKUP UNIT FEEDING APPARATUS AND OPTICAL DISC DRIVE USING THE SAME

(75) Inventor: Un-jin Choi, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 126 days.

(21) Appl. No.: 10/635,682

(22) Filed: Aug. 7, 2003

(65) Prior Publication Data
US 2004/0205795 A1  Oct. 14, 2004

(30) Foreign Application Priority Data
Nov. 14, 2002  (KR) .................. 10-2002-0070658

(51) Int. Cl.
*G11B 17/30* (2006.01)
(52) U.S. Cl. ..................................... 720/675
(58) Field of Classification Search ............... 720/675, 720/672, 659; 369/223
See application file for complete search history.

(56) References Cited

U.S. PATENT DOCUMENTS

| | | | |
|---|---|---|---|
| 5,864,533 A * | 1/1999 | Yamada et al. | 720/693 |
| 6,002,658 A * | 12/1999 | Aso et al. | 720/651 |
| 6,046,974 A * | 4/2000 | Uehara | 720/663 |
| 6,058,098 A * | 5/2000 | Kato | 720/663 |
| 6,335,915 B1 * | 1/2002 | Uchiyama et al. | 369/223 |
| 6,373,812 B1 * | 4/2002 | Kim et al. | 720/675 |
| 6,657,943 B1 * | 12/2003 | Muto et al. | 720/619 |
| 6,724,714 B1 * | 4/2004 | Kato et al. | 720/672 |
| 2004/0052198 A1 * | 3/2004 | Liao | 369/223 |

FOREIGN PATENT DOCUMENTS

| | | | |
|---|---|---|---|
| JP | 62145540 A | * | 6/1987 |
| JP | 07129970 A | | 5/1995 |
| JP | 13-023321 | | 1/2001 |
| JP | 2001023321 A | | 1/2001 |
| JP | 2001160272 A | * | 6/2001 |
| JP | 14-279739 | | 9/2002 |
| KR | 2000-15215 | | 7/2000 |

OTHER PUBLICATIONS

Notice of Office Action issued by Korean Patent Office on Nov. 11, 2004 during examination of a corresponding Korean application.

* cited by examiner

*Primary Examiner*—William Korzuch
*Assistant Examiner*—Mark Blouin
(74) *Attorney, Agent, or Firm*—Staas & Halsey LLP

(57) ABSTRACT

An optical pickup unit feeding apparatus for moving an optical pickup unit by rotation of a lead screw with a spiral groove in an optical disc drive, including a guide member combined with the optical pickup unit, the guide member including one or more contact parts engaging the spiral groove formed on the lead screw, applying a force to the optical pickup unit in response to the rotation of the lead screw, wherein the force moves the optical pickup; and an elastic member having a first elastic section elastically engaging the contact parts to the spiral groove, and a second elastic section forcing the contact parts not to separate from the spiral groove, wherein a spring constant of the second elastic section is greater than a spring constant of the first elastic section.

18 Claims, 7 Drawing Sheets

OPTICAL PICKUP UNIT FEEDING APPARATUS AND OPTICAL DISC DRIVE USING THE SAME

CROSS-REFERENCE TO RELATED APPLICATIONS

This application claims the benefit of Korean Application No. 2002-70658, filed Nov. 14, 2002, in the Korean Intellectual Property Office, the disclosure of which is incorporated herein by reference.

BACKGROUND OF THE INVENTION

1. Field of the Invention

The present invention relates to an optical disc drive, and, more particularly, to an optical pickup unit feeding apparatus for an optical disc drive, for feeding an optical pickup unit in a radial direction of an optical disc.

2. Description of the Related Art

Optical disc drives generally record data on, or reproduce data from, disc-shaped media such as CDs, DVDs, or the like. An optical disc drive includes an optical pickup unit feeding apparatus for feeding an optical pickup unit in a radial direction of the optical disc when data is recorded on, or reproduced from, an optical disc.

The optical pickup unit feeding apparatus is generally actuated by a rotary motor. However, since the optical pickup unit has to move from one side of an optical disc to another side along a straight line, the rotary motion of the motor has to be changed into a linear motion. The change of the rotary motion into a linear motion may be performed using a rack gear and a pinion gear or a lead screw.

FIG. 1 is a schematic plan view of an optical pickup unit feeding apparatus using a lead screw. Referring to FIG. 1, a lead screw 20, on which a spiral groove 21 is formed, is rotated while being attached to a driving motor 50. A guide member 30 is combined with an optical pickup unit 10 and includes a contact part 31, which is combined with the spiral groove 21 of the lead screw 20. A coil spring 40 applies an elastic force to the guide member 30 in a direction along which the contact part 31 is combined with the spiral groove 21.

According to the above-described structure, when the lead screw 20 rotates, the contact part 31 moves along the spiral groove 21, and thus the optical pickup unit 10 slides along a guide shaft 60.

FIG. 2 illustrates the relationship between a spring force and a displacement of the coil spring 40. Referring to FIG. 2, since the spring force increases in proportion to the displacement, a spring constant k1, i.e., the inclination of the spring force, is constant.

When the displacement of the coil spring 40 is X1, the spring force F1 is first applied to the contact part 31. Since a rotating force and power consumption of the driving motor 50, which rotates the lead screw 20, increases with an increase in a spring force F1 applied to the contact part 31, it is preferable that the spring force F1 is small. Next, when the lead screw 20 starts rotating, the contact part 31 starts moving while engaging the spiral groove 21. Here, when a reaction force, generated due to inertia of the optical pickup unit 10 and the friction between the optical pickup unit 10 and the guide shaft 60, gets larger than the spring force F1, the contact part 31 is pushed toward the optical pickup unit 10.

If the optical pickup unit feeding apparatus is used for a long period of time, a contact surface between the guide shaft 60 and the optical pickup unit 10 is worn away, or dust piles up on the guide shaft 60. This increases the friction between the guide shaft 60 and the optical pickup unit 10, which further increases the reaction force of the contact part 31, and when the reaction force exceeds a predetermined value F2, the contact part 31 is separated from the spiral groove 21. Thus, the optical pickup 10 fails to move by a predetermined distance in spite of the rotation of the lead screw 20. This phenomenon is called the mis-feeding phenomenon.

The maximum value of the reaction force, which maintains the engagement between the contact part 31 and the spiral groove 21, becomes $F2=F1+k1 \times d$, where d denotes the depth of the spiral groove 21. Accordingly, an increase in the spring force F1 can prevent the mis-feeding phenomenon. However, as discussed above, the power consumption of the driving motor 50 increases with an increase in the spring force F1.

Additionally, noise and vibrations, occurring during the rotation of the driving motor 50, propagate through the lead screw 20 to the contact part 31. Since a damping ability of the coil spring 40 is weak, the coil spring 40 transmits noise and vibration up to the optical pickup unit 10, which has a bad effect on recording/reproduction characteristics of the optical disc drive. Also, noise and vibrations may degrade the quality of the optical disc drive.

SUMMARY OF THE INVENTION

Accordingly, the present invention provides an optical pickup unit feeding apparatus which can prevent vibrations and noise occurring during the rotation of a driving motor from being transmitted to an optical pickup and reduce power consumption of the driving motor for rotating a lead screw, and an optical disc drive using the same.

Additional aspects and/or advantages of the invention will be set forth in part in the description which follows and, in part, will be obvious from the description, or may be learned by practice of the invention.

According to an aspect of the present invention, there is provided an optical pickup unit feeding apparatus for moving an optical pickup unit by rotation of a lead screw with a spiral groove in an optical disc drive. The optical pickup unit feeding apparatus includes a guide member and an elastic member. The guide member is combined with the optical pickup unit and includes one or more contact parts engaging the spiral groove formed on the lead screw, and applying a force to the optical pickup unit in response to the rotation of the lead screw, wherein the force moves the optical pickup unit. The elastic member has a first elastic section elastically engaging the contact parts to the spiral groove, and a second elastic section forcing the contact parts not to separate from the spiral groove. A spring constant of the second elastic section is greater than a spring constant of the first elastic section.

According to another aspect of the present invention, there is also provided an optical pickup unit feeding apparatus for moving an optical pickup unit by rotation of a lead screw with a spiral groove. The optical pickup unit feeding apparatus includes a guide member and an elastic member. The guide member is combined with the optical pickup unit and includes one or more contact parts engaging the spiral groove formed on the lead screw, and applying a force to an optical pickup unit in response to the rotation of the lead screw, wherein the force moves the optical pickup unit. The elastic member pushes the contact parts toward the spiral groove. The elastic member is a viscoelastic material having a good damping characteristic.

According to still another aspect of the present invention, there is also provided an optical disc drive including an optical pickup unit and an optical pickup unit feeding apparatus. The optical pickup unit accesses a rotating optical disc. The optical pickup unit feeding apparatus moves the optical pickup unit in a radial direction of the optical disc by rotation of a lead screw with a spiral groove. The optical pickup unit feeding apparatus includes a guide member and an elastic member. The guide member is combined with the optical pickup unit and includes one or more contact parts engaging the spiral groove formed on the lead screw, applying a force to the optical pickup unit in response to the rotation of the lead screw, wherein the force moves the optical pickup unit. The elastic member has a first elastic section elastically engaging the spiral groove, and a second elastic section forcing the contact parts not to separate from the spiral groove. A spring constant of the second elastic section is greater than a spring constant of the first elastic section.

According to yet another aspect of the present invention, there is also provided an optical disc drive including an optical pickup unit and an optical pickup unit feeding apparatus. The optical pickup unit accesses a rotating optical disc. The optical pickup unit feeding apparatus moves the optical pickup unit in a radial direction of the optical disc by rotation of a lead screw with a spiral groove. The optical pickup unit feeding apparatus includes a guide member and an elastic member. The guide member is combined with the optical pickup unit and includes one or more contact parts engaging the spiral groove formed on the lead screw, and applies a force to the optical pickup unit in response to the rotation of the lead screw, wherein the force moves the optical pickup unit, The elastic member pushes the contact part toward the spiral groove. The elastic member is made of a viscoelastic material having a good damping characteristic.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
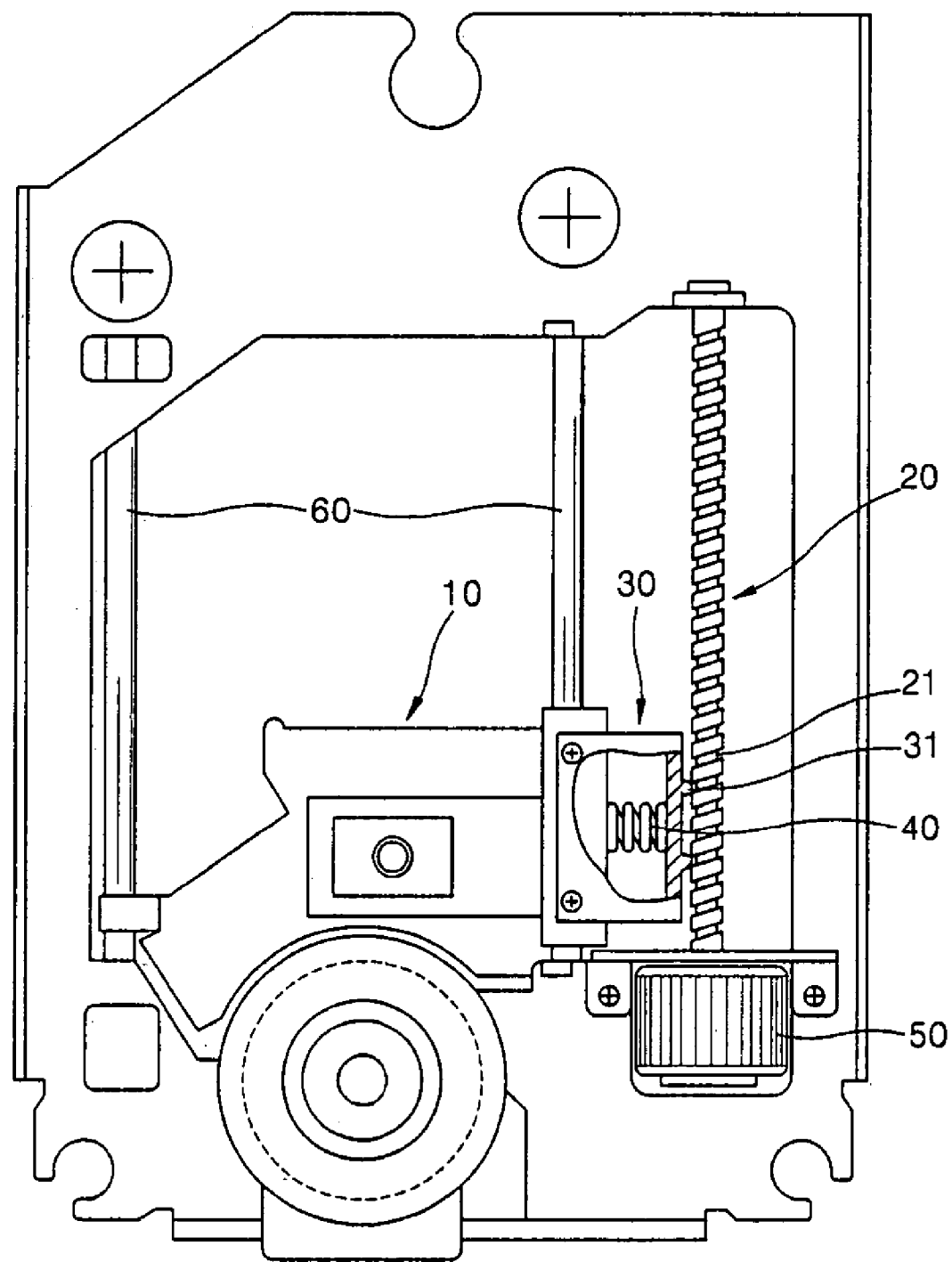
FIG. 1 is a schematic plane view of an optical pickup unit feeding apparatus using a lead screw according to the related art.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
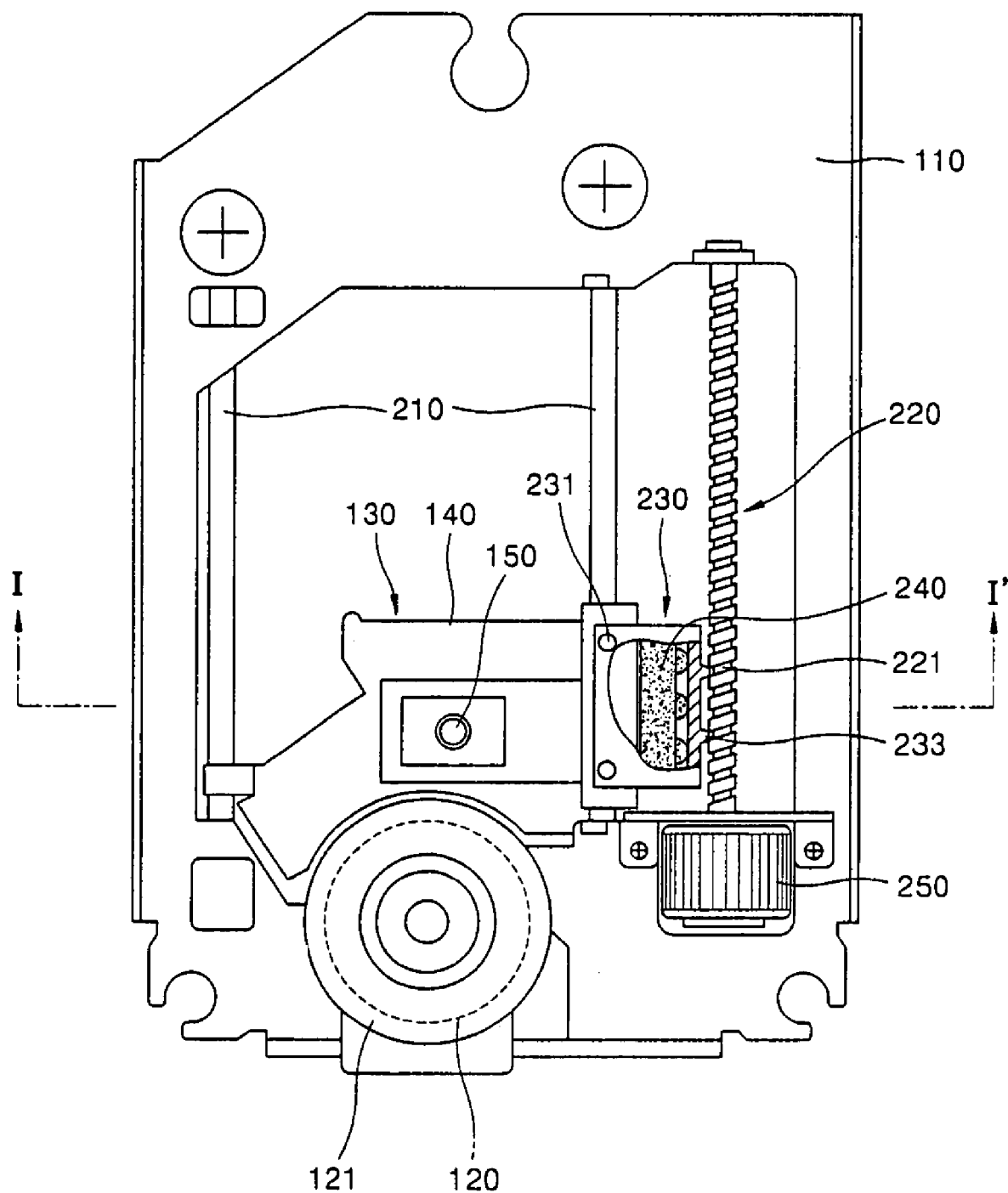
FIG. 3 is a plane view of an optical disc drive according to an embodiment of the present invention.
Figure 4:
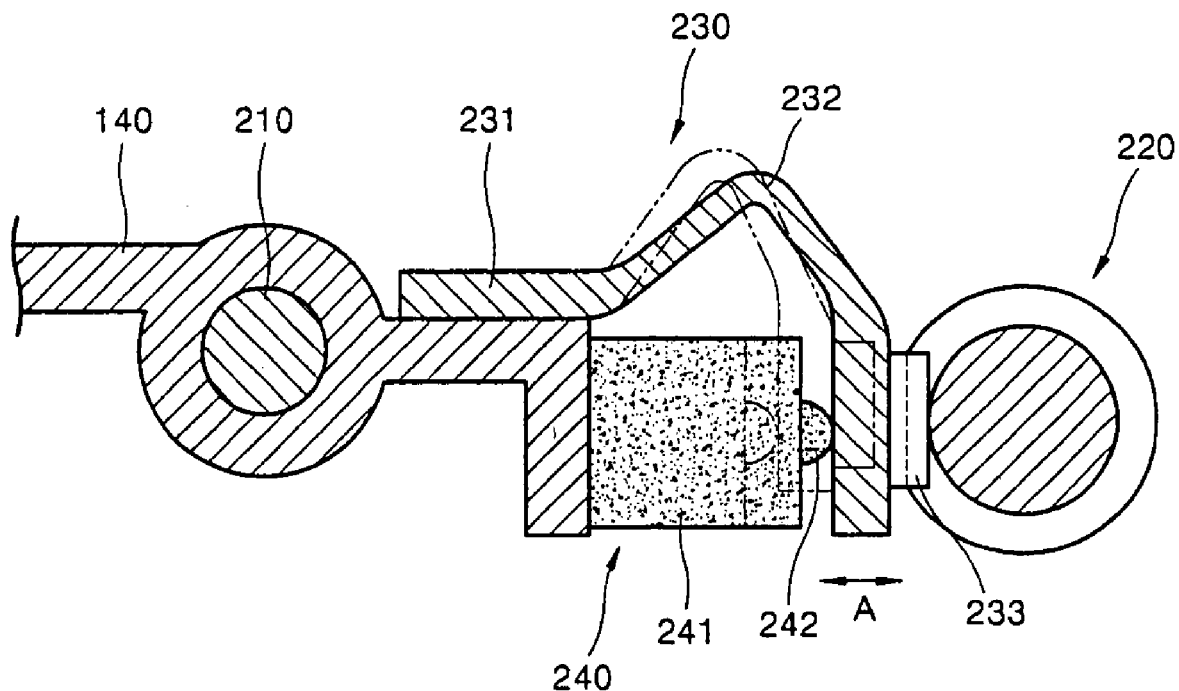
FIG. 4 is a cross-sectional view taken along line I–I' of FIG. 3.

FIG. 3 is a plan view of an optical disc drive according to an embodiment of the present invention, and FIG. 4 is a cross-sectional view taken along line I–I' of FIG. 3. Referring to FIG. 3, a spindle motor 120 and an optical pickup unit 130 are installed on a main base 110. The spindle motor 120 rotates an optical disc. A turntable 121, oh which the optical disc is placed, is combined with a rotating shaft of the spindle motor 120. The optical pickup unit 130 moves along a radial direction of the optical disc that rotates, and includes a pickup base 140 and an optical pickup 150, which is mounted on the pickup base 140 and records data on, or reproduces data from, a recording surface of the optical disc.

The optical pickup unit feeding apparatus includes a guide shaft 210, a lead screw 220, a driving motor 250, a guide member 230, and an elastic member 240. The guide shaft 210 is installed along the radial direction of the optical disc on the main base 110 and supports the pickup base 140 to guide the sliding of the optical pickup unit 130. The lead screw 220 is parallel with the guide shaft 210, and a spiral groove 221 is formed at the outer perimeter of the lead screw 220. The driving motor 250 rotates the lead screw 220.

The guide member 230 includes combining parts 231, which are screwed to the pickup base 140, at least one or more contact parts 233, which engage with the spiral groove 221 of the lead screw 220, and a connecting part 232, which connects the combining parts 231 and the contact parts 233 so that the contact parts 233 move between the pickup base 140 and the lead screw 220. In the present embodiment, the number of contact parts 233 is two for a stable engagement with the lead screw 220. It is preferable that the contact parts 233 are inclined to correspond to the inclination of the spiral groove 221. In a case where more than two contact parts are included, it is preferable that the contact parts are spaced apart from each other a predetermined distance equal to a pitch of the spiral groove 221 of the lead screw 220. In the present embodiment, the connecting part 232 forms a single body with the combining parts 231 and the contact parts 233. As shown in FIG. 4, as the connecting part 232 extends from the combining parts 231, the thickness of the connecting part 232 is reduced. Thus, when the contact parts 233 move as indicated by arrow A, the connecting part 232 bends flexibly, taking various shapes. Here, it is preferable that the guide member 230 is made of a flexible plastic material.

The elastic member 240 allows the contact parts 233 to engage the spiral groove 221, and also forces the contact parts 233 not to separate from the spiral groove 221. For example, the elastic member 240 may be made of a viscoelastic material such as a rubber. The elastic member 240 includes a body 241, which contacts the pickup base 140, and at least one protrusion 242, which protrudes from the body 241 and contacts the rear surface of the contact parts 233. In the present embodiment, the protrusion 242 is spherical. However, a plurality of protrusions having various shapes may be formed in order to adjust the strength of an elastic force applied to the contact parts 233. The protrusion 242 forms a first elastic section to apply an elastic force to the contact parts 233 so that the contact parts 233 elastically engage the spiral groove 221. The body 241 forms a second elastic section, providing force so that the contact parts 233 do not separate from the spiral groove 221.

The operation and effect of the elastic member 240 having the above-described structure will now be described.

Figure 5:
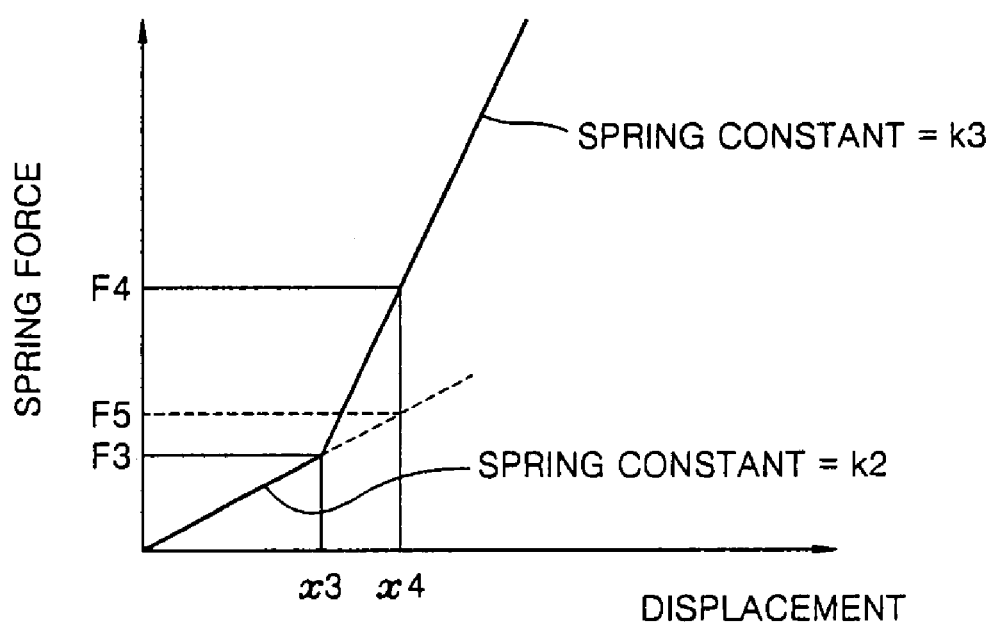
FIG. 5 is a graph illustrating the relationship between a spring force and displacement of an elastic member shown in FIG. 3.

FIG. 5 is a graph illustrating the relationship between a spring force and a displacement of the elastic member 240 shown in FIGS. 3 and 4. Referring to FIG. 5, the first elastic section, in which the protrusion 242 deforms elastically, corresponds to a value from a displacement zero to a displacement X3. The second elastic section, in which the body 241 deforms elastically, corresponds to a value after the displacement X3. A spring constant of the first elastic section is K2, and is smaller than a spring constant K3 of the second elastic section.

When the optical pickup unit feeding apparatus is completely assembled, the elastic member 240 applies a spring force F3 to the contact parts 233. In order to reduce the power consumption of the driving motor 250, it is preferable that a force that makes the contact parts 233 engage the spiral groove 221 is small. Thus, it is preferable that the protrusion 242 deforms elastically, and that the displacement is nearly equal to, or slightly smaller than, X3.

In this state, when the driving motor 250 rotates the lead screw 220, the contact parts 233 start moving longitudinally along the spiral groove 221, and thus the optical pickup unit 130 starts sliding in the radial direction of the optical disc.

If the optical pickup unit feeding apparatus is used for a long period of time, a contact surface between the guide shaft 210 and the pickup base 140 is worn away, or dust piles up on the guide shaft 210, which results in an increase in friction between the guide shaft 210 and the pickup base 140. This further increases the reaction force of the contact parts 233. If the reaction force becomes larger than the spring force F3, the contact parts 233 are pushed toward the pickup base 140. Due to this, when the displacement becomes greater than X3, the body 241 starts deforming. Then, a spring force generated by the second elastic section of the elastic member 240 is applied to the contact parts 233. Since the spring constant of the second elastic section is greater than the spring constant of the first elastic section, when the same displacement occurs in the first and second elastic sections, a spring force generated by the second elastic section is larger than that of the first elastic section. Referring to FIG. 5, when the displacement is X4, if the second elastic section did not exist and the first elastic section extended up to the displacement X4, the spring force would be F5, which is smaller than the spring force F4 generated by the second elastic section. Thus, the contact parts 233 can be effectively prevented from being separated from the spiral groove 221 by making a second elastic section having a greater spring constant than a first elastic section.

Figure 2:
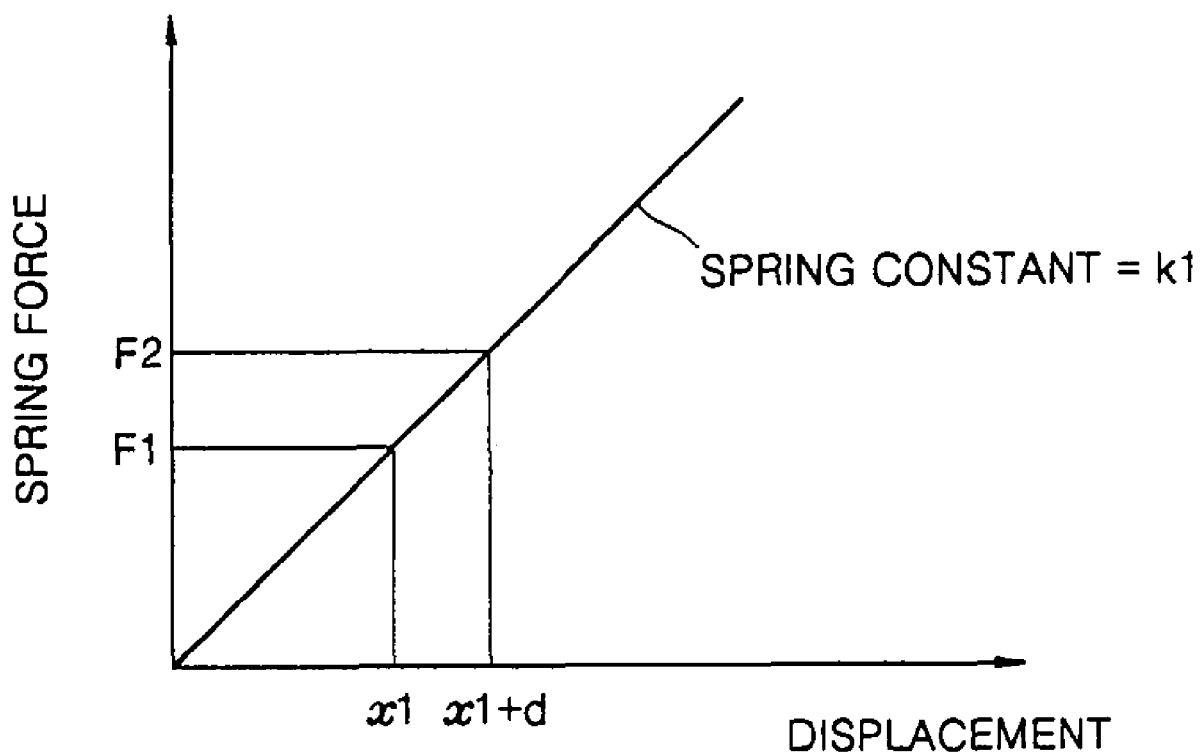
FIG. 2 is a graph illustrating the relationship between a spring force and a displacement of a coil spring shown in FIG. 1.
Figure 6:
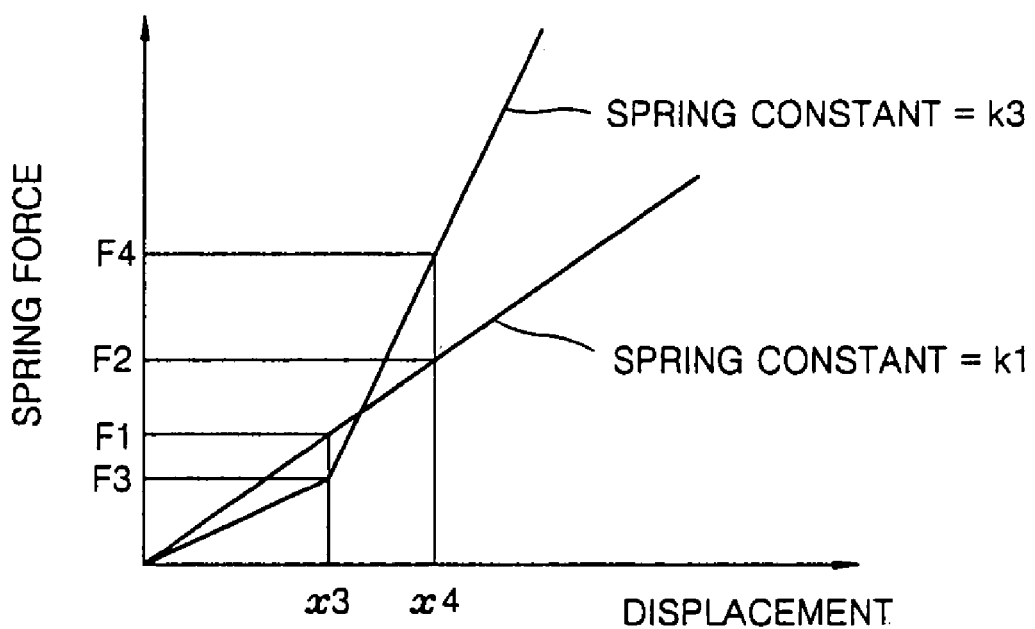
FIG. 6 is a graph comparing FIG. 2 and FIG. 5.

FIG. 6 is a graph for comparing FIG. 2 and FIG. 5. Referring to FIG. 6, when the displacement is X3, the spring force F1 of the coil spring 40, shown in FIG. 1, having a spring constant k1, is greater than the spring force F3 of the elastic member 240 according to the present embodiment. Also, when the displacement is X4, the spring force F2 of the coil spring 40 is smaller than the spring force F4 of the elastic member 240. That is, in the first elastic section of the optical pickup unit feeding apparatus according to the present embodiment, the driving motor 250 is less loaded than the conventional optical pickup unit feeding apparatus, and the second elastic section applies a stronger spring force to the contact parts 233 to prevent the contact parts 233 from being separated from the spiral groove 221.

Accordingly, as in the present embodiment, if the elastic member 240 has a first elastic section having a small spring constant, and a second elastic section having a higher spring constant than the first elastic section, power consumption of the driving motor 250 can be reduced and the contact parts 233 can be effectively prevented from being separated from the spiral groove 221.

Figure 7:
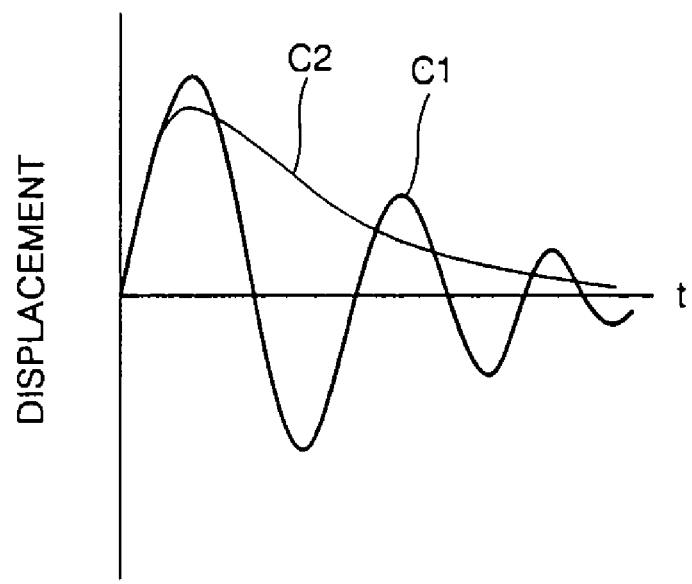
FIG. 7 is a graph illustrating an effect of damping vibrations and noise due to the elastic member shown in FIG. 3.

Since the elastic member 240 of the present embodiment may be made of a viscoelastic material, the elastic member 240 has a good damping characteristic. Referring to FIG. 7, vibrations and noise generated due to the driving motor 250 is damped from C1 to C2 by the elastic member 240. Thus, an effect of vibrations on the optical pickup unit 130 can be minimized, and data can be recorded/reproduced in a stable manner. Also, since noise can be reduced, the quality of the optical disc drive can be improved.

In FIG. 4, the at least one protrusion may not be formed in another embodiment of the present invention, and the body may directly push a contact part toward a lead screw. In this case, vibrations and noise can be reduced by using only one elastic section in an elastic member formed of a viscoelastic material having a good damping characteristic.

Figure 8:
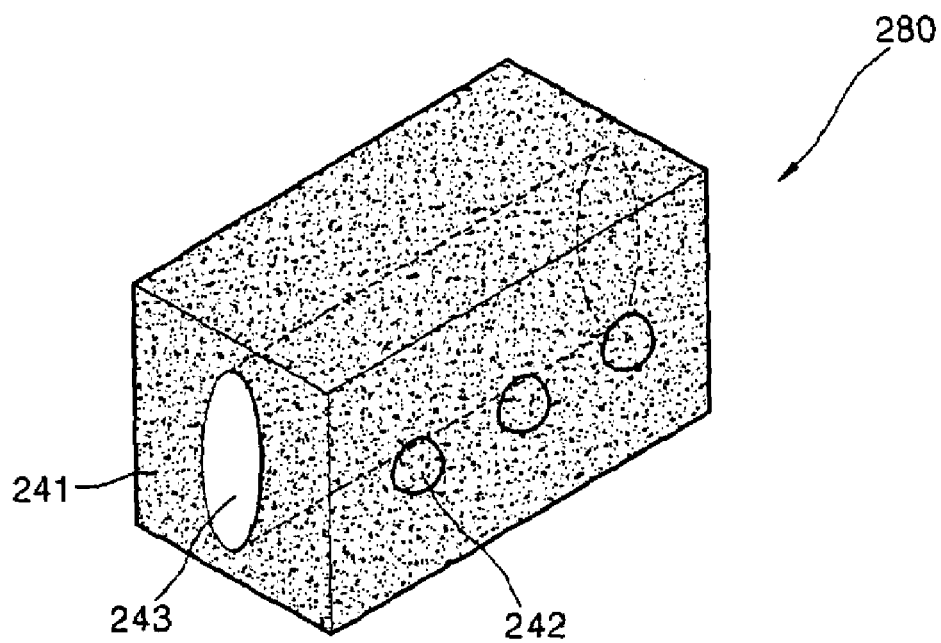
FIG. 8 is a perspective view of an elastic member according to another embodiment of the present invention.
Figure 9:
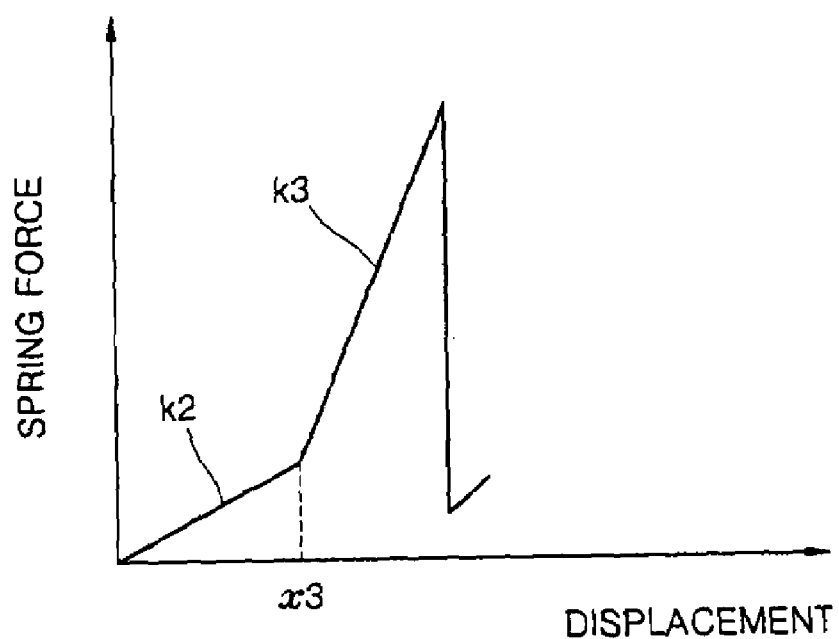
FIG. 9 is a graph illustrating the relationship between a spring force and a displacement of the elastic member shown in FIG. 8.

FIG. 8 is a perspective view of an elastic member according to another embodiment of the present invention, and FIG. 9 is a graph illustrating the relationship between a spring force and a displacement of the elastic member shown in FIG. 8.

Referring to FIG. 8, an elastic member 280 is made of a viscoelastic material and includes a body 241 and at least one protrusion 242, which protrudes from the body 241 and contacts the rear surfaces of the contact parts 233. A cavity 243 is formed through the body 241. The channel 243 forms a third elastic section, and sharply deforms and removes a spring force applied to the contact parts 233 when the displacement of the elastic member 280 reaches a level on which the contact parts 233 are separated from the spiral groove 221. In a case where the motor 250 continues to rotate, although the optical pickup unit 130 reaches both ends of the guide shaft 210, due to a control error, if the contact parts 233 stay engaged with the spiral groove 221 the driving motor 250 may be overloaded, or the contact parts 233 may be damaged. Thus, in this case, overheating of the driving motor 250 and damage of the contact parts 233 may be prevented by temporarily reducing or removing the spring force pushing the contact parts 233 using the third elastic section so that the contact parts 233 are temporarily separated from the spiral groove 221, and later re-engage with the spiral groove 221.

In the above-described embodiments, an elastic member is made of a viscoelastic material. However, the optical pickup unit feeding apparatus according to the present invention is not limited to this.

Figure 10:
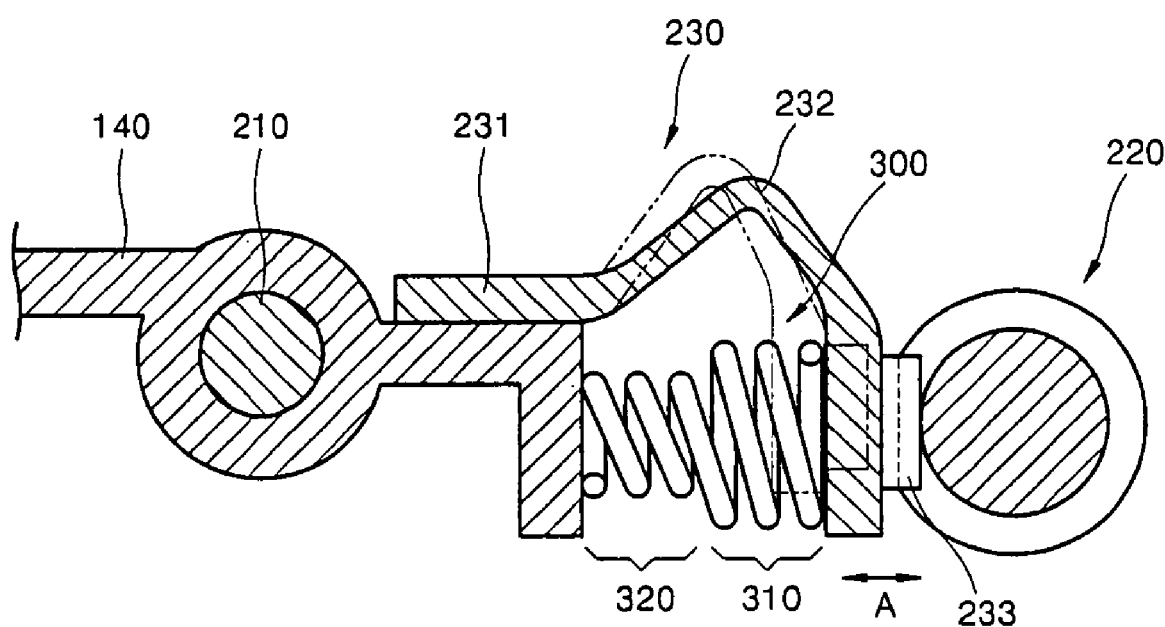
FIG. 10 is a cross-sectional view of an elastic member according to still another embodiment of the present invention.

FIG. 10 is a cross-sectional view of an elastic member according to still another embodiment of the present invention. Referring to FIG. 10, a coil spring 300 is used as an elastic member. One end of the coil spring 300 is supported by the pickup base 140 and the other end thereof is supported by the rear surfaces of the contact parts 233. The coil spring 300 has first and second elastic parts 310 and 320, respectively having diameters D1 and D2. A spring constant of the coil spring 300 is inversely proportional to the diameter thereof. Thus, if the diameter D1 is greater than the diameter D2, a spring constant of the first elastic part 310 becomes smaller than a spring constant of the second elastic part 320. In this structure, the relationship between the spring force and the displacement shown in FIG. 5 can be obtained. Therefore, during the initial displacement X3, the first elastic part 310 applies a small force to the contact parts 233 when deforming, so that the load in the driving motor 250 is small, and power consumption of the driving motor 250 is reduced. Also, if the displacement exceeds X3, the second elastic part 320 applies a greater force to the contact parts 233 when deforming, so as to effectively prevent the contact parts 233 from being separated from the spiral groove 221.

As is described above, an optical pickup unit feeding apparatus according to embodiments of the present invention, and an optical disc drive using the same, can achieve the following effects.

Since a small spring force can be applied to a contact part by using a first elastic section, the power consumption of a driving motor can be reduced.

Also, the contact part can be effectively prevented from being separated from a spiral groove due to a second elastic section having a greater spring constant than the first elastic section.

Moreover, when an optical pickup unit operates abnormally due to a control error, the spring force applied to the contact part can be reduced or removed. Thus, overheating of the driving motor and damage of the contact part can be prevented.

Furthermore, vibrations occurring due to the driving motor can be damped or removed by using a viscoelastic material as an elastic member. Therefore, an effect of vibrations on the optical pickup unit can be minimized, which can improve the quality of the optical disc drive.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup unit feeding apparatus for moving an optical pickup unit by rotation of a lead screw with a spiral groove in an optical disc drive, comprising:
 a guide member combined with the optical pickup unit, the guide member comprising:
 one or more contact parts engaging the spiral groove formed on the lead screw, and applying a force to the optical pickup unit in response to the rotation of the lead screw, wherein the force moves the optical pickup unit; and
 an elastic member comprising a first elastic section elastically engaging the contact parts to the spiral groove, and a second elastic section forcing the contact parts not to separate from the spiral groove,
 wherein a spring constant of the second elastic section is greater than a spring constant of the first elastic section, and
 wherein the elastic member is a viscoelastic material having a damping characteristic.

2. An optical pickup unit feeding apparatus for moving an optical pickup unit by rotation of a lead screw with a spiral groove in an optical disc drive, comprising:
 a guide member combined with the optical pickup unit, the guide member comprising:
 one or more contact parts engaging the spiral groove formed on the lead screw, and applying a force to the optical pickup unit in response to the rotation of the lead screw, wherein the force moves the optical pickup unit; and
 an elastic member comprising a first elastic section elastically engaging the contact parts to the spiral groove, and a second elastic section forcing the contact parts not to separate from the spiral groove,
 wherein a spring constant of the second elastic section is greater than a spring constant of the first elastic section, and
 wherein the elastic member comprises:
 a body forming the second elastic section; and
 at least one protrusion from the body forming the first elastic section.

3. The optical pickup unit feeding apparatus of claim 2, wherein the elastic member is a viscoelastic material having a damping characteristic.

4. An optical pickup unit feeding apparatus for moving an optical pickup unit by rotation of a lead screw with a spiral groove in an optical disc drive, comprising:
 a guide member combined with the optical pickup unit, the guide member comprising:
 one or more contact parts engaging the spiral groove formed on the lead screw, and applying a force to the optical pickup unit in response to the rotation of the lead screw, wherein the force moves the optical pickup unit; and
 an elastic member comprising a first elastic section elastically engaging the contact parts to the spiral groove, and a second elastic section forcing the contact parts not to separate from the spiral groove,
 wherein a spring constant of the second elastic section is greater than a spring constant of the first elastic section, and
 wherein the elastic member further comprises a third elastic section to reduce an elastic force of the elastic member when a displacement of the elastic member in the second elastic section would be sufficient, without the third elastic section, to separate the contact parts from the spiral groove.

5. The optical pickup unit feeding apparatus of claim 4, wherein the elastic member comprises:
 a body forming the second elastic section;
 at least one protrusion from the body forming the first elastic section; and
 at least one cavity in the body comprising the third elastic section.

6. The optical pickup unit feeding apparatus of claim 5, wherein the elastic member is a viscoelastic material having a damping characteristic.

7. An optical pickup unit feeding apparatus for moving an optical pickup unit by rotation of a lead screw with a spiral groove in an optical disc drive, comprising:
 a guide member combined with the optical pickup unit, the guide member comprising:
 one or more contact parts engaging the spiral groove formed on the lead screw, and applying a force to the optical pickup unit in response to the rotation of the lead screw, wherein the force moves the optical pickup unit; and
 an elastic member comprising a first elastic section elastically engaging the contact parts to the spiral groove, and a second elastic section forcing the contact parts not to separate from the spiral groove,
 wherein a spring constant of the second elastic section is greater than a spring constant of the first elastic section, and wherein the elastic member is a coil spring, wherein the first and second elastic sections have different diameters, and a spring constant of the coil spring is inversely proportional to the diameter thereof.

8. The optical pickup unit feeding apparatus of claim 7, wherein a diameter of the first elastic section is greater than a diameter of the second elastic section.

9. An optical pickup unit feeding apparatus for moving an optical pickup unit by rotation of a lead screw with a spiral groove, comprising:
   a guide member combined with the optical pickup unit, the guide member comprising:
   one or more contact parts engaging the spiral groove formed on the lead screw, applying a force to the optical pickup unit in response to the rotation of the lead screw, wherein the force moves the optical pickup unit; and
   an elastic member pushing the contact parts toward the spiral groove,
   wherein the elastic member is a viscoelastic material having a good damping characteristic.

10. An optical disc drive comprising:
   an optical pickup unit accessing a rotating optical disc; and
   an optical pickup unit feeding apparatus moving the optical pickup unit in a radial direction of the optical disc by rotation of a lead screw with a spiral groove,
   wherein the optical pickup unit feeding apparatus comprises:
      a guide member combined with an optical pickup unit, the guide member comprising:
      one or more contact parts engaging the spiral groove formed on the lead screw, applying a force to the optical pickup unit in response to the rotation of the lead screw,
      wherein the force moves the optical pickup unit; and
         an elastic member comprising a first elastic section elastically engaging the contact parts the spiral groove, and a second elastic section forcing the contact parts not to separate from the spiral groove,
         wherein a spring constant of the second elastic section is greater than a spring constant of the first elastic section, and
         wherein the elastic member is a viscoelastic material having a good damping characteristic.

11. An optical disc drive comprising:
   an optical pickup unit accessing a rotating optical disc; and
   an optical pickup unit feeding apparatus moving the optical pickup unit in a radial direction of the optical disc by rotation of a lead screw with a spiral groove,
   wherein the optical pickup unit feeding apparatus comprises:
      a guide member combined with an optical pickup unit, the guide member comprising:
         one or more contact parts engaging the spiral groove formed on the lead screw, applying a force to the optical pickup unit in response to the rotation of the lead screw, wherein the force moves the optical pickup unit; and
         an elastic member comprising a first elastic section elastically engaging the contact parts the spiral groove, and a second elastic section forcing the contact parts not to separate from the spiral groove,
         wherein a spring constant of the second elastic section is greater than a spring constant of the first elastic section, and
         wherein the elastic member comprises:
         a body forming the second elastic section; and
         at least one protrusion from the body forming the first elastic section.

12. The optical disc drive of claim 11, wherein the elastic member is a viscoelastic material having a good damping characteristic.

13. An optical disc drive comprising:
   an optical pickup unit accessing a rotating optical disc; and
   an optical pickup unit feeding apparatus moving the optical pickup unit in a radial direction of the optical disc by rotation of a lead screw with a spiral groove,
   wherein the optical pickup unit feeding apparatus comprises:
      a guide member combined with an optical pickup unit, the guide member comprising:
         one or more contact parts engaging the spiral groove formed on the lead screw, applying a force to the optical pickup unit in response to the rotation of the lead screw, wherein the force moves the optical pickup unit; and
         an elastic member comprising a first elastic section elastically engaging the contact parts the spiral groove, and a second elastic section forcing the contact parts not to separate from the spiral groove,
      wherein a spring constant of the second elastic section is greater than a spring constant of the first elastic section, and
      wherein the elastic member further comprises a third elastic section to reduce an elastic force of the elastic member when a displacement of the elastic member in the second elastic section would be sufficient, without the third elastic section, to separate the contact parts from the spiral groove.

14. The optical disc drive of claim 13, wherein the elastic member comprises:
   a body forming the second elastic section;
   at least one protrusion from the body forming the first elastic section; and
   at least one cavity in the body comprising the third elastic section.

15. The optical disc drive of claim 14, wherein the elastic member is a viscoelastic material having a good damping characteristic.

16. An optical disc drive comprising:
   an optical pickup unit accessing a rotating optical disc; and
   an optical pickup unit feeding apparatus moving the optical pickup unit in a radial direction of the optical disc by rotation of a lead screw with a spiral groove,
   wherein the optical pickup unit feeding apparatus comprises:
      a guide member combined with the optical pickup unit, the guide member comprising:
         one or more contact parts engaging the spiral groove formed on the lead screw, applying a force to the optical pickup unit in response to the rotation of the lead screw, wherein the force moves the optical pickup unit; and
      an elastic member pushing the contact parts toward the spiral groove,
      wherein the elastic member is made of a viscoelastic material having a good damping characteristic.

17. A method of moving an optical pickup unit by rotation of a cylindrical member with a groove in an optical disc drive, the method comprising:

provinding viscoelastic force on one or more contact parts engaged with the groove formed on the cylindrical member; and rotating the cylindrical member in opposite directions;

wherein the viscoelastic force is provided by an viscoelastic member comprising a first elastic section and a second elastic section, and a spring constant of the second elastic section is greater than a spring constant of the first elastic section.

18. The method of claim 17, wherein the first elastic section elastically engages the contact parts to the groove, and the second elastic section forces the contact parts not to separate from the groove.

* * * * *